Aug. 25, 1959      F. M. O. FÖRSTER      2,901,691

METHOD AND APPARATUS FOR NON-DESTRUCTIVE TESTING

Filed April 12, 1955      2 Sheets—Sheet 1

Inventor
FRIEDRICH M.O. FOERSTER

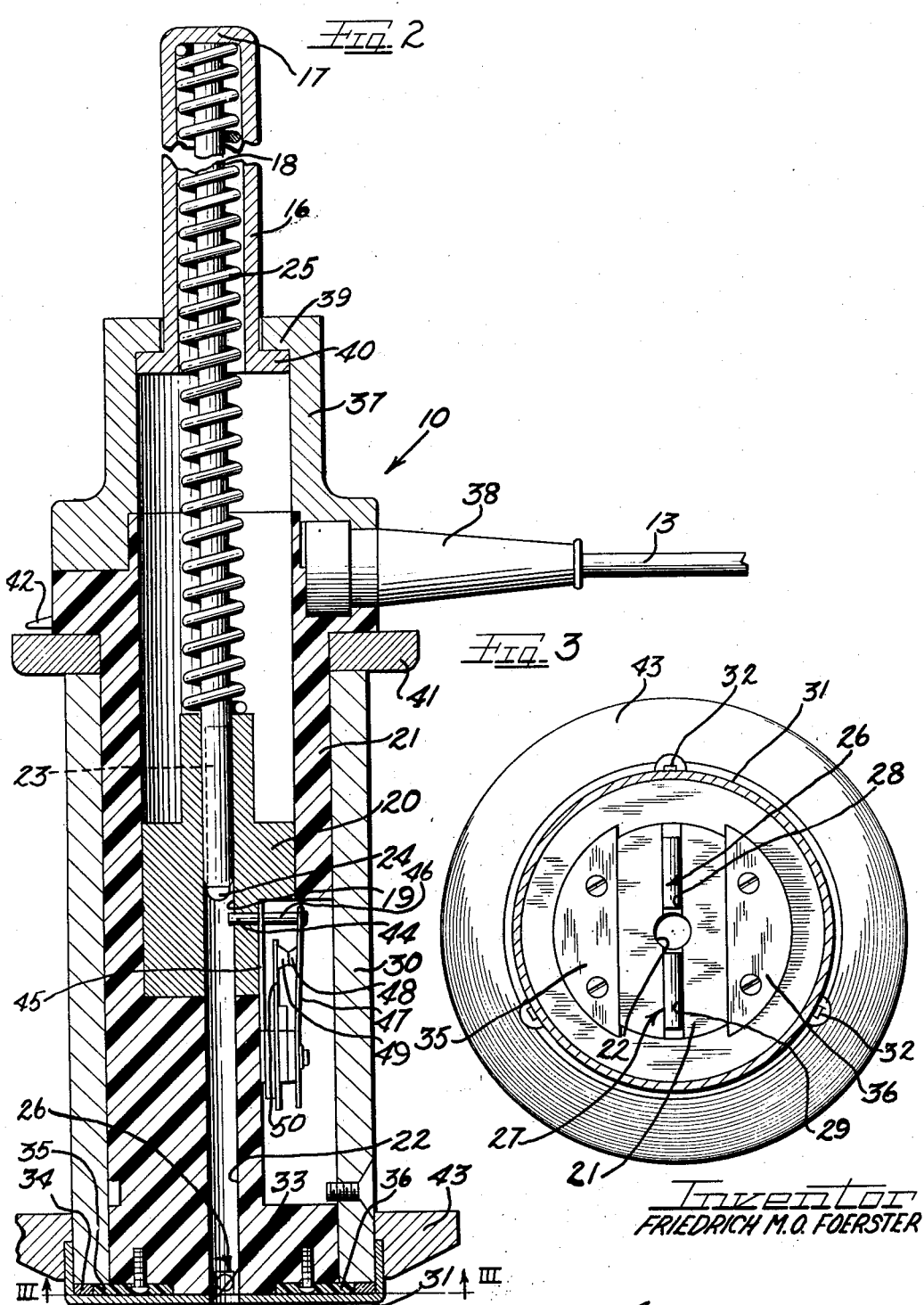

United States Patent Office 2,901,691
Patented Aug. 25, 1959

2,901,691

METHOD AND APPARATUS FOR NON-DESTRUCTIVE TESTING

Friedrich M. O. Förster, Reutlingen, Germany

Application April 12, 1955, Serial No. 500,947

14 Claims. (Cl. 324—34)

This invention relates to methods and apparatus for non-destructive testing and more particularly to the testing of structures of magnetic material to determine coercive force and physical properties related thereto.

Various technological or physical properties of ferromagnetic materials such as hardness, deep-drawing ability and carbon content are in most cases unequivocally a function of the magnetic coercive force of the material. Where this is not the case, there are at least wide ranges of such properties in which the functional relationship with the coercive force remains unequivocal. Therefore, the measurement of coercive force for the purpose of evaluating the material is especially valuable if it can be carried out non-destructively.

In addition to measurement of coercive force, it is also very desirable to obtain a knowledge of direction-dependence in a structure under test, to determine the anisotropy of the coercive force and thereby the physical properties which vary with it. The knowledge of anisotropy of the coercive force is very important in the production of deep-drawn parts in which only isotropic material can be used, because one encounters, otherwise, folding and the especially feared formulation of lobes during the deep-drawing. It is also important during punching of stator sheets and rotor sheets for the electrical industry because one encounters otherwise divergencies in field strength and induction which endanger the operation.

In addition, the increasing use in the manufacture of transformers of core sheets having high anisotropy of permeability and consequently of coercive force has reached such a magnitude that the correct measurement of anisotropy has become a pressing production problem.

It may be noted that measurement of coercive force and anisotropy of coercive force has heretofore been accomplished by measurements on samples punched from specimen parts. In one testing operation, disc-shaped punch samples are hung up in a manner such that they are free to rotate in a homogeneous magnetic field and a force will be exerted urging the samples into the direction of the easiest magnetizability, the smallest coercive force. The torque exerted on the punch sample is a measure of the anisotropy. While this method has been performed automatically, an appreciable time is still required for each measurement and in addition, this method necessitates a partial destruction of a part.

In another method heretofore used, a pair of strips are taken from a rolled sheet of material to be tested, one in the direction of rolling and one transverse to it, and the strips are tested by means of so-called coercive force meters or according to well known classical methods. This method, of course, also operates destructively and is not easy to accomplish.

It may be noted that in both the disc and the strip-pair, only local values of coercive force are obtained and such values are not even reliably obtained because the deformations during punching and cutting leave internal stresses which can cause erroneous results, especially in the case of high quality extremely magnetic soft sheets, if compared with the finished parts of entirely different shape.

This invention was evolved with the object of satisfying a widespread industrial need for methods and apparatus for non-destructively testing specimen structures of magnetic material to determine coercive force and related physical properties, and anisotropy of coercive force.

In the practice of this invention, a magnetizing field is applied to a specimen structure and the field strength at points adjacent the structure is measured. The magnetizing field is preferably applied and removed with the field induced by remanent magnetization being measured, so as to obtain an accurate indication of coercive force. This may be accomplished by means of a magnet, preferably permanent, which is moved into and out of a position in which one pole thereof is disposed adjacent the specimen structure.

To test for anisotrope of coercive force, the magnetizing field is concentrated in a localized portion of the structure and the field intensity and direction is measured at points about such localized portion, as by means of a sensing coil or coils.

According to a specific feature of the invention, a pair of field intensity measuring means, such as coils, are disposed in aligned relation and are connected in opposition so that the effects of the earth's field or stray fields will cancel, but the two measuring means are located in different positions with respect to the localized magnetized portion of the specimen structure, so as to respond to the field to be measured. Preferably, the two measuring means are located symmetrically on opposite sides of the localized magnetized portion, so that the effects of the field to be measured on the measuring means will be additive.

Another feature of the invention is in the construction of a sensing head in which the magnetizing means and the field measuring means are mounted in a manner such that an accurate measurement is readily and quickly obtained.

This invention contemplates other objects, features and advantages which will become more fully apparent from the following detailed description taken in conjunction with the accompanying drawings which illustrate a preferred embodiment and in which:

Figure 2 is a cross-sectional view through the sensing head of Figure 1;

Figure 3 is a cross-sectional view taken substantially along line III—III of Figure 2;

Figure 1:
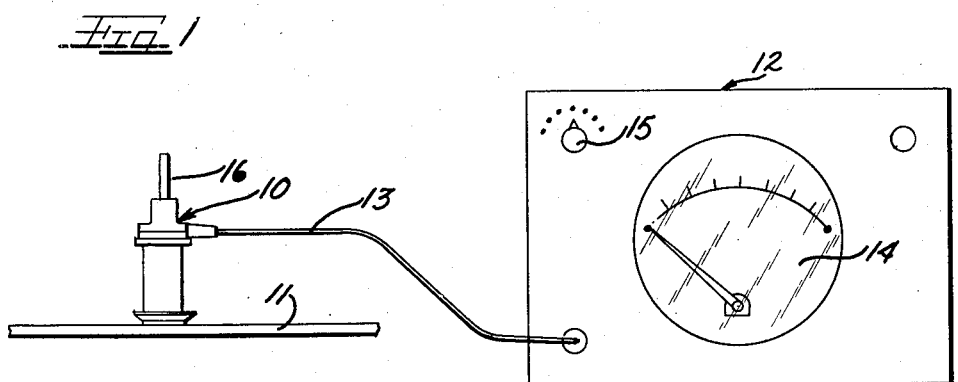
Figure 1 is a side elevational view of a measuring instrument with a sensing head connected thereto, both constructed according to the principles of this invention.

Reference numeral 10 generally designates a sensing head constructed according to the principles of this invention which may be disposed on a specimen structure 11, preferably a sheet or construction part having a flat surface, to measure the coercive force and anisotrope of coercive force thereof. The sensing head 10 is connecetd to an instrument 12 through a cable 13, the instrument 12 including an indicator 14, such as a micro-ammeter and a sensitivity control 15.

In operation, the sensing head 10 is disposed on the surface of the structure 11 and a plunger 16 is depressed manually to dispose a pole of a permanent magnet against a localized portion of the surface of the structure 11, the magnet being then returned to its initial position. Field intensity measuring means, such as sensing coils or probes, in the sensing head 10 respond to the remanent field in the structure 11 to give an indication on the meter 14, which indicates the coercive force in the structure 11. The field measuring means of the sensing head 10 may then be rotated through 360° while observing the indication on the meter 14, so as to determine the anisotrope of coercive force. As indicated above, the coercive force of the material indicates hardness, deep-drawing ability, carbon content and various other physical properties of magnetic materials which it is desirable to determine.

Referring now to Figures 2 and 3, the plunger 16 is of hollow cylindrical form and has an upper end wall portion 17 secured to the upper end of a rod 18 which extends downwardly beyond the lower end of the plunger 16 into a central vertical bore 19 of a plug 20 which is fixedly disposed within a sleeve 21 having a bore 22 aligned with and forming a continuation of the bore 19. The rod 18 is hollow and in its lower end portion carries a permanent magnet 23 having a hemispherical lower end portion 24 projecting beyond the lower end of the rod 18.

The plunger 16 and elements connected thereto are urged upwardly to a position as illustrated in Figure 2 by a coiled compression spring 25 disposed about the rod 18 between the upper end of the plug 20 and the upper end wall 17 of the plunger 16. When the plunger 16 is depressed against the force of the compression spring 25, the lower end 24 of the permanent magnet 23 is engaged with the surface of the specimen structure under test to magnetize the same. The plunger 16 is then allowed to move back to its initial position under the force of the spring 25.

To measure the fields induced by the remanent magnetization of the specimen structure, a pair of sensing probes 26 and 27 are disposed in slots 28 and 29 in the lower end of the sleeve 21, on opposite sides of the bore 22. The probes 26 and 27 may comprise coils wound on cores of magnetic material and connected through suitable leads to conductors of the cable 13. The operation of the probes will be described more in detail in connection with the circuit diagram of Figure 4.

To determine anisotrope, the probes 26 and 27 are preferably rotatable through 360° and for this purpose, the sleeve 21 may be journaled within a sleeve 30 arranged to be supported on the structure under test by a generally cup-shaped cap member 31 secured to the lower end portion of the sleeve 30 by means of screws 32. The cap member 31 may have a central opening 33 aligned with the bore 22 of the sleeve 21.

To maintain an accurate spacing between the probes 26, 27 and the surface of the structure under test, the upper surface of the cap 31 may be spaced from the lower surface of the support sleeve 30, through a spacer ring 34 and a pair of plates 35 and 36 are secured to the lower end of the sleeve 21 and project radially outwardly between the lower end surface of the support sleeve 30 and the upper surface of the cap 31.

At its upper end, the sleeve 21 carries a cap member 37 of inverted cup-shaped configuration which serves to lock a bushing 38 at the end of the cable 13 in place and which has a radially inwardly projecting flange portion 39 at its upper end overlying a radially outwardly projecting flange 40 of the plunger 16 to limit upward displacement of the plunger 16 and associated elements. The cap member 37 may have a knurled intermediate portion and may serve as a means for rotating the sleeve 21 and the probes 26, 27 carried thereby.

For indicating rotation of the probes, a ring 41 is disposed on the upper end of the support sleeve 30 and has indicia marks on its upper surface with which a pointer 42 may be aligned, the pointer 42 being carried by the sleeve 21.

It is sometimes desirable that the sensing head 10 be pressed down onto a structure under test with considerable force to obtain uniform pressure engagement between the surface of the structure under test and the surface of the lower cap member 31. In this event, a pair of mating cylindrical half sections may be secured about the sleeve 30 between the ring 41 and a ring 43 disposed on the lower end of the sleeve 30.

The permanent magnet 23 has a field strength much greater than the remanent field induced in the structure under test. To prevent the field of the permanent magnet 23 from having any undesirable effect during the field measuring operation, the plug 20 is preferably of a magnetic material to provide a low reluctance path between the poles at the upper and lower ends of the magnet 23 in the inoperative position of Figure 2, to minimize the effect on the probes 26, 27.

According to a specific feature of the invention, the field measuring means are rendered inoperative when the magnet 23 is moved downwardly toward the structure under test, so as to prevent the intense fields of the magnet from overloading and injuring the instrument. For this purpose, a pin 44 is disposed in an opening in the wall of the plug 20 with its inner end in the path of the lower end of the rod 18, the pin 44 being carried by a leaf-spring member 45 which is moved to the right, as viewed in Figure 2, when the rod 18 is moved downwardly past the pin 44. The member 45 engages a pin 46 carried by a second leaf-spring member 47 which carries a contact 48 engageable with a contact 49 carried by a plate 50, which is insulated from the member 47. When the rod 18 is moved downwardly past the pin 44, the members 45 and 47 will be moved to the right as viewed in Figure 2 to disengage the contact 48 from the contact 49. The members 47 and 50 are connected through suitable leads to conductors of the cable 13 and through such conductors to the instrument 12, to render the field measuring means inoperative when the contacts 47, 48 are disengaged.

Figure 4:
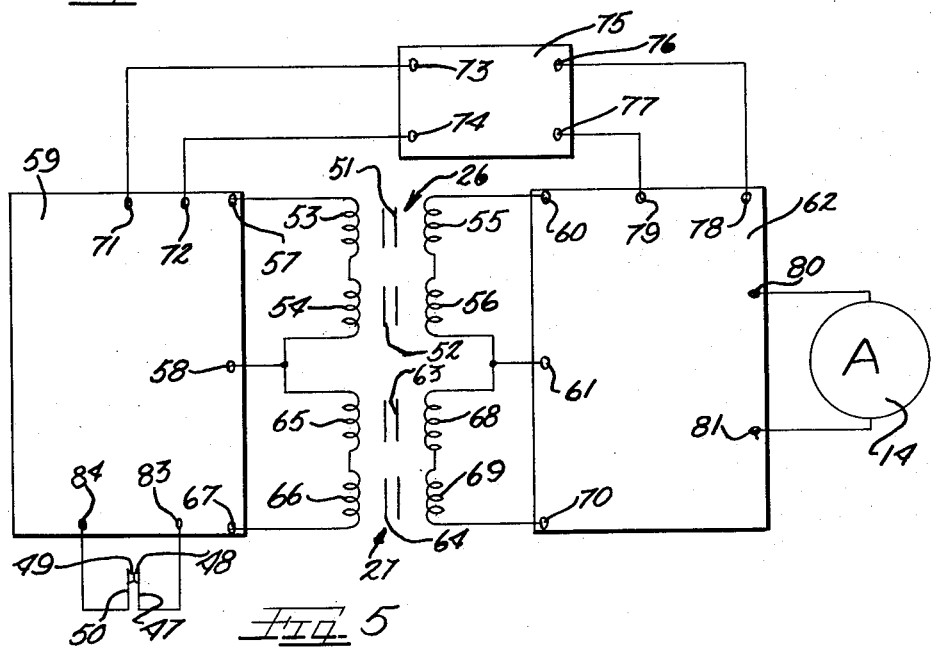
Figure 4 is a schematic block diagram of the instrument of Figure 1.

Referring now to Figure 4, the probe 26 may comprise a pair of core elements 51 and 52 of magnetic material and series-connected primary coils 53 and 54 and series-connected secondary coils 55 and 56 wound on the core elements 51 and 52, respectively, with the connection of the secondary coils being reversed with respect to the connection of the primary coils. The primary coils 53 and 54 are connected to terminals 57 and 58 of a source of alternating current such as an oscillator 59 (which may operate at 10 kilocycles, for example), and the secondary coils 55 and 56 are connected to terminals 60 and 61 of an amplifying and detector circuit 62.

The probe 27 may similarly comprise a pair of core elements 63 and 64, primary coils 65 and 66 connected in series between the terminal 58 and a terminal 67 and a pair of secondary coils 68 and 69 connected between the terminal 61 and a terminal 70 of the amplifying and detecting circuit 62.

The oscillator 59 additionally has a pair of output terminals 71 and 72 connected to terminals 73 and 74 of a frequency doubling circuit 75 having output terminals 76 and 77 connected to terminals 78 and 79 of the amplifying and detecting circuit 62. The circuit 62 has output terminals 80 and 81 connected to the microammeter 14.

In operation, the alternating current applied to the primary coils may be sufficient to obtain saturating flux densities in the core elements and any uni-directional flux in the core elements will result in the generation of a second harmonic signal in the secondary coils of each probe, such signal having a magnitude increasing with an increase in the magnitude of such uni-directional flux and having a phase dependent upon the direction of such uni-directional flux. Such signals induced in the secondary coils of the probes are applied with the signal from the frequency doubling circuit 75 to phase detectors in the circuit 62 and direct current output signals are obtained having polarities dependent upon the direction of the flux in the core elements of the corresponding probes, and having magnitudes dependent upon the magnitudes of the fluxes in the probes.

Such direct current output signals from the phase detectors are applied to the micro-ammeter 14 to indicate the resultant thereof.

It may be noted that this general arrangement of measuring a second harmonic signal by means of a phase detector and a frequency doubling circuit, to determine flux, is by itself known in the art and for that reason, the exact circuits utilized are not described in detail.

Figure 5:
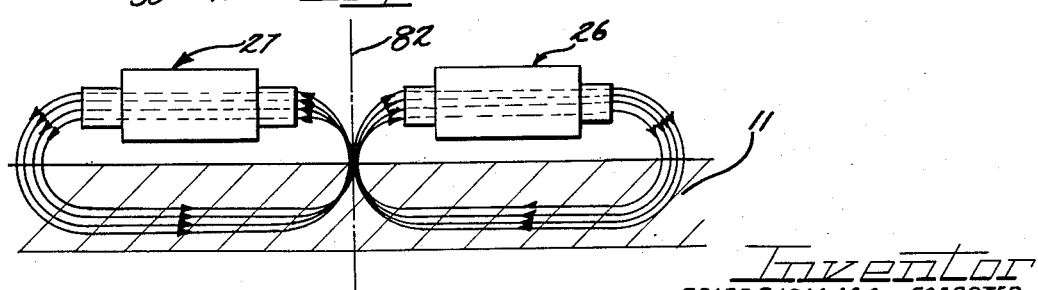
Figure 5 is a diagrammatic illustration of the fields in the sensing coils or probes of the sensing head of Figure 1.

Referring now to Figure 5, the relative disposition of the probes 26 and 27 relative to fluxes induced by remanent magnetization of the specimen structure 11 is diagrammatically illustrated. As shown, the probes 26 and 27 may be mounted with their cores in axial alignment in substantially parallel relation to the surface of the structure 11 and on opposite sides of the axis of magnetization, indicated diagrammatically by a line 82, which, of course, would be the axis of the magnet 23. The flux induced by the remanent magnetization of the structure 11 passes in one direction through the core of the probe 26 and in the reverse direction through the core of the probe 27. Flux from the earth's field, and flux from other sources, will pass through the cores of both probes in the same direction and, in general, such fluxes will be uniform and the same in both probes. Accordingly, by properly connecting the signals from the probe coils 26 and 27, the signals arising from the earth's field and other stray fluxes are balanced out, while the signals arising from the magnetization of the structure 11 are additive. Thus an extremely accurate and reliable indication is achieved.

As indicated above, the field-measuring means may be rendered inoperative by disengagement of the contacts 48 and 49. This may be accomplished in any desired manner, and as illustrated diagrammatically in Figure 4, the members 47 and 50 may be connected respectively to terminals 83 and 84 of the oscillator 59, the oscillator being inoperative when the circuit between terminals 83 and 84 is open and being operative when such circuit is closed.

It will thus be appreciated that this invention provides methods and apparatus for readily, accurately and nondestructively measuring coercive force and anisotropy of coercive force of specimen structures of magnetic material. This invention is particularly advantageous in the anisotropic testing of sheets or construction parts having flat surfaces and may be used to measure hardnes, deep-drawing ability, carbon content and other properties which are unequivocally a function of magnetic coercive force or, in any case, there are at least wide ranges in such properties in which the functional relationship with coercive force is unequivocal. The invention may be used to detect the existence, direction and extent of internal stresses in a specimen structure which will affect the coercive force thereof.

It will be understood that modifications and variations may be effected without departing from the spirit and scope of the novel concepts of this invention.

I claim as my invention:

1. In a method of testing a specimen structure of magnetic material to determne coercive force and physical properties related thereto, the steps of applying to the specimen structure a magnetizing field of a certain intensity which is concentrated in a localized portion of the structure, removing said magnetizing field, and measuring the remanent field strength at points in proximity to and in fixed relation to said localized portion.

2. In a method of testing a specimen structure of magnetic material having a generally flat surface to determine relative coercive force and related physical properties in directions parallel to such flat surface, the steps of applying to the structure a magnetizing field which is generally perpendicular to such flat surface and concentrated in a localized portion of the structure, and measuring the field strength induced by remanent magnetization of said magnetic material adjacent such flat surface around such localized portion.

3. In a method of testing a specimen structure of magnetic material to determine coercive force and physical properties related thereto, the steps of applying to the specimen structure a magnetizing field which is concentrated in a localized portion of the structure, measuring the field strength in one direction at a point adjacent the structure, measuring the field strength in a directly opposite direction at a second point adjacent the structure, and indicating the difference between the two measurements.

4. In a method of testing a specimen structure of magnetic material to determine coercive force and physical properties related thereto by means of a permanent magnet having a pair of poles, the steps of moving the magnet to dispose one pole thereof adjacent a portion of the specimen structure, moving the magnet away from the structure, and measuring the fields induced by the remanent magnetization of the structure at a point in fixed relation to said portion of the specimen structure.

5. In a method of testing a specimen structure of magnetic material to determine coercive force and physical properties related thereto, the steps of applying to the specimen structure a magnetizing field of a certain intensity which is concentrated in a localized portion of the structure, removing the magnetic field, and measuring the field strength along each of a plurality of differently directed axes each of which passes through said localized portion in order to determine the direction-dependence of said properties of said magnetic material.

6. In an instrument for testing a specimen structure of magnetic material to determine coercive force and related physical properties, means for applying to the specimen structure a magnetizing field of a certain intensity which is concentrated in a localized portion of the structure, and means for measuring the induced remanent magnetic field strength at points in proximity to and in fixed relation to such localized portion along a preselected one of a plurality of directional axes passing through such localized portion.

7. In an instrument for testing a specimen structure of magnetic material to determine coercive force and related physical properties, means for applying to the specimen structure a magnetizing field which is concentrated in a localized portion of the structure, means for measuring the remanent magnetic field induced in said specimen, and means supporting said measuring means for movement about the center of said localized portion.

8. In an instrument for testing a specimen structure of magnetic material to determine coercive force and related physical properties, means for applying to the specimen structure a magnetizing field which is concentrated in a localized portion of the structure, first means for measuring the field strength in one direction at a first point adjacent the structure spaced from such localized portion, second means for responding to the field in an exactly opposite direction at a second point spaced from said first point, and means responsive to the combined outputs of said first and second field measuring means.

9. In an instrument for testing a specimen structure of magnetic material to determine coercive force and related physical properties, means for applying and removing a magnetizing field to and from the specimen structure, means adjacent said field applying and removing means for measuring the fields induced by the remanent magnetization of the structure, and means for rendering said measuring means inoperable during the application and removal of the magnetizing field.

10. In an instrument for testing a specimen structure of magnetic material to determine coercive force and related physical properties, a magnet having a pair of poles, means for supporting said magnet for movement of one of said poles toward and away from a portion of the specimen structure, field measuring means, and means for supporting said field measuring means for movement about said portion of the specimen structure.

11. In an instrument for testing a specimen structure of magnetic material to determine coercive force and related physical properties, a permanent magnet having a pair of poles, means for supporting said magnet for movement from an inoperative position to an operative position in which one of said poles is disposed adjacent a portion of the specimen structure and then back to said inoperative position, means for measuring the fields induced by the remanent magnetization of the structure at a point in fixed relation to said portion of the specimen structure, and means providing a flux path of magnetic material between said poles in said inoperative position of said magnet.

12. In an instrument for testing a specimen structure of magnetic material to determine coercive force and related physical properties, a first sleeve, means at one end of said sleeve for engaging a surface portion of the specimen structure, a second sleeve rotatably journalled in said first sleeve, a magnet movable axially in said second sleeve toward and away from the specimen structure, and a sensing coil carried by said second sleeve adjacent the specimen structure.

13. In an instrument for testing a specimen structure of magnetic material to determine coercive force and related physical properties, support means arranged to engage a surface portion of the specimen structure, a magnet carried by said support means for movement toward and away from the specimen structure, and a sensing coil carried by said support means for measuring the remanent magnetization of the specimen structure.

14. In an instrument for testing a specimen structure of magnetic material to determine coercive force and related physical properties, support means arranged to engage a surface portion of the specimen structure, a magnet carried by said support means for reciprocable movement of one of its poles along an axis generally normal to said surface portion of the specimen structure, and a sensing coil carried by said support means for movement about said axis.

References Cited in the file of this patent

UNITED STATES PATENTS

| | | |
|---|---|---|
| Re. 21,927 | Brace et al. | Oct. 21, 1941 |
| 2,346,773 | McBride et al. | Apr. 18, 1944 |
| 2,581,209 | Shepard et al. | Jan. 1, 1952 |
| 2,600,857 | De La Mater | June 17, 1952 |
| 2,608,621 | Peterson | Aug. 26, 1952 |
| 2,649,568 | Felch | Aug. 18, 1953 |